(12) United States Patent
Zentz et al.

(10) Patent No.: US 11,086,548 B2
(45) Date of Patent: Aug. 10, 2021

(54) DYNAMIC RE-BALANCING IN HETEROGENEOUS STORAGE SYSTEMS

(71) Applicant: EMC IP Holding Company LLC, Hopkinton, MA (US)

(72) Inventors: Dustin Hunt Zentz, Northborough, MA (US); Owen Martin, Hopedale, MA (US); Adnan Sahin, Needham, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/263,197

(22) Filed: Jan. 31, 2019

(65) Prior Publication Data

US 2020/0249865 A1    Aug. 6, 2020

(51) Int. Cl.
*G06F 3/06* (2006.01)
*G06F 12/02* (2006.01)

(52) U.S. Cl.
CPC ............ *G06F 3/0649* (2013.01); *G06F 3/067* (2013.01); *G06F 3/0616* (2013.01); *G06F 3/0644* (2013.01); *G06F 12/0246* (2013.01); *G06F 2206/1012* (2013.01)

(58) Field of Classification Search
USPC .................. 711/165; 710/74; 714/47.1–47.3
See application file for complete search history.

(56) References Cited

U.S. PATENT DOCUMENTS

| | | | |
|---|---|---|---|
| 8,010,738 B1* | 8/2011 | Chilton | G11C 16/349 711/103 |
| 2010/0332749 A1* | 12/2010 | Benhase | G06F 11/1096 711/114 |
| 2013/0205070 A1* | 8/2013 | Koseki | G06F 3/0616 711/103 |
| 2014/0244899 A1* | 8/2014 | Schmier | G06F 3/0616 711/103 |
| 2017/0262906 A1* | 9/2017 | Saley | G06F 3/0688 |

* cited by examiner

*Primary Examiner* — Ilwoo Park
(74) *Attorney, Agent, or Firm* — Muirhead and Saturnelli, LLC (57) ABSTRACT

Moving data among a plurality of non-volatile storage devices of a storage device includes accumulating credits at each of a plurality of periodic intervals for separate portions of the devices, wherein the credits correspond to a wear rating for each of the devices, reducing credits for each of the portions at each of the periodic intervals based on an amount of data written to each of the portions during each of the intervals, on the wear rating for each of the devices, and on a percent life used for the devices, and moving data from a first one of the portions having a relatively low amount of credits to a second one of the portions having a relatively high amount of credits. The devices may be solid state drives. The wear rating may be a drive writes per day rating provided by a manufacture of the solid state drive.

18 Claims, 6 Drawing Sheets

DYNAMIC RE-BALANCING IN HETEROGENEOUS STORAGE SYSTEMS

TECHNICAL FIELD

This application relates to the field of computer systems and storage devices therefor and, more particularly, to the field of distributing data among solid state storage devices to optimize use thereof.

BACKGROUND OF THE INVENTION

Host processor systems may store and retrieve data using a storage device containing a plurality of host interface units (I/O modules), disk drives, and disk interface units (disk adapters). The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to any one of the actual disk drives. Allowing multiple host systems to access the single storage device unit allows the host systems to share data stored therein.

In some cases, the disk drives may be implemented in whole or in part using solid state drives (SSD). SSDs are provided by manufacturers with a Drive Writes Per Day (DWPD) rating that indicates an average number of writes per day of the entire capacity of the SSD that the SSD is designed to endure. For example, if an SSD has a capacity of 10,000 MB, and the DWPD of the SSD is 2, then the SSD is rated for 20,000 MB (2×10,000) average writes per day. In some cases, manufacturers may not honor a warrantee if a failed SSD had sustained more writes than the DPWD rating of the SSD prior to failure. On the other hand, SSDs with a higher DWPD rating tens to be more expensive, and so it is desirable to use the more expensive SSDs to their capacity without exceeding the DPWD rating.

Systems that optimize use of SSDs move data from SSDs that are more worn out to SSDs that are less worn out. While this may intuitively seem to be a sufficient solution, and may even work in many cases, it does not take into account all of the factors necessary to determine how data should be moved. For example, in a system with two SSD devices where one (MP1) is wearing out too quickly and the other (MP2) is wearing out slower than its rated DWPD, it would seem 10% of write activity could be moved from MP1 to MP2.

However, unless MP1 and MP2 share the same capacity and DWPD, this rebalancing may not have the intended result. For instance, if MP1 was 30DWPD and MP2 was 1DWPD, moving 10% of write activity would cause MP2 to wear out, which is not the desired result.

Accordingly, it is desirable to provide a mechanism for rebalancing data on SSDs that optimizes use of the SSDs so that SSDs do not prematurely wear out and are used to near their capacity.

SUMMARY OF THE INVENTION

According to the system described herein, moving data among a plurality of non-volatile storage devices of a storage device includes accumulating credits at each of a plurality of periodic intervals for separate portions of the devices, wherein the credits correspond to a wear rating for each of the devices, reducing credits for each of the portions at each of the periodic intervals based on an amount of data written to each of the portions during each of the intervals, on the wear rating for each of the devices, and on a percent life used for the devices, and moving data from a first one of the portions having a relatively low amount of credits to a second one of the portions having a relatively high amount of credits. The devices may be solid state drives. The wear rating may be a drive writes per day rating provided by a manufacture of the solid state drive. The portions of devices may correspond to media pools having a same wear rating and storage capacity. The media pools may be grouped into endurance pools having the same wear rating. The second portion may be chosen from a same endurance pool as the first portion. Moving data may include swapping data between the first one of the portions and second one of the portions. Swapping data may include marking the data for reallocation on a next write. The non-volatile storage devices may store data that is accessed on the storage device using a plurality of tables. The plurality of tables may cause the storage device to present a logical device for access by a host.

According to the system described herein, a non-transitory computer-readable medium contains software that moves data among non-volatile storage devices of a storage device. The software includes executable code that accumulates credits at each of a plurality of periodic intervals for separate portions of the devices, wherein the credits correspond to a wear rating for each of the devices, executable code that reduces credits for each of the portions at each of the periodic intervals based on an amount of data written to each of the portions during each of the intervals, on the wear rating for each of the devices, and on a percent life used for the devices, and executable code that moves data from a first one of the portions having a relatively low amount of credits to a second one of the portions having a relatively high amount of credits. The devices may be solid state drives. The wear rating may be a drive writes per day rating provided by a manufacture of the solid state drive. The portions of devices may correspond to media pools having a same wear rating and storage capacity. The media pools may be grouped into endurance pools having the same wear rating. The second portion may be chosen from a same endurance pool as the first portion. Moving data may include swapping data between the first one of the portions and second one of the portions. Swapping data may include marking the data for reallocation on a next write. The non-volatile storage devices may store data that is accessed on the storage device using a plurality of tables. The plurality of tables may cause the storage device to present a logical device for access by a host.

BRIEF DESCRIPTION OF THE DRAWINGS

Embodiments of the system are described with reference to the several figures of the drawings, noted as follows.

DETAILED DESCRIPTION OF VARIOUS EMBODIMENTS

Figure 1:
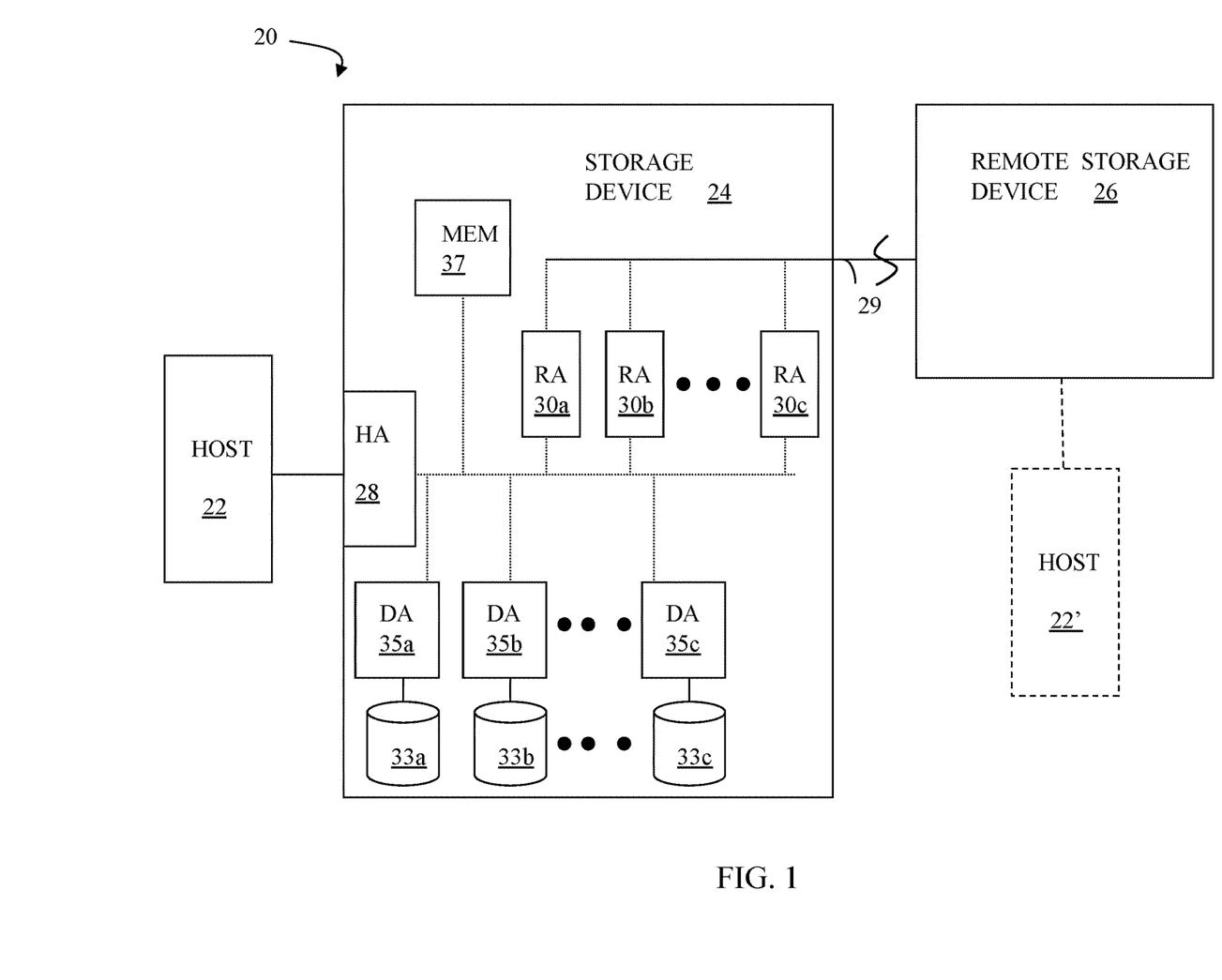
FIG. 1 is a schematic illustration of a storage system showing a relationship between a host and a storage device that may be used in connection with an embodiment of the system described herein.

FIG. 1 is a schematic illustration of a storage system 20 showing a relationship between a host 22 and a storage device 24 that may be used in connection with an embodiment of the system described herein. In an embodiment, the storage device 24 may be a Symmetrix or VMAX storage system produced by Dell EMC of Hopkinton, Mass.; however, the system described herein may operate with other appropriate types of storage devices. Also illustrated is another (remote) storage device 26 that may be similar to, or different from, the storage device 24 and may, in various embodiments, be coupled to the storage device 24, for example, via a network. The host 22 reads and writes data from and to the storage device 24 via an HA 28 (host adapter), which facilitates an interface between the host 22 and the storage device 24. Although the diagram 20 only shows one host 22 and one HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the storage device 24 may be copied to the remote storage device 26 via a link 29. For example, the transfer of data may be part of a data mirroring or replication process that causes data on the remote storage device 26 to be identical to the data on the storage device 24. Although only the one link 29 is shown, it is possible to have additional links between the storage devices 24, 26 and to have links between one or both of the storage devices 24, 26 and other storage devices (not shown). The storage device 24 may include a first plurality of remote adapter units (RA's) 30a, 30b, 30c. The RA's 30a-30c may be coupled to the link 29 and be similar to the HA 28, but are used to transfer data between the storage devices 24, 26.

The storage device 24 may include one or more non-volatile storage devices, such as disks or SSDs, each containing a different portion of data stored on the storage device 24. FIG. 1 shows the storage device 24 having a plurality of non-volatile storage devices 33a-33c. The storage device (and/or remote storage device 26) may be provided as a stand-alone device coupled to the host 22 as shown in FIG. 1 or, alternatively, the storage device 24 (and/or remote storage device 26) may be part of a storage area network (SAN) that includes a plurality of other storage devices as well as routers, network connections, etc. (not shown). The storage devices may be coupled to a SAN fabric and/or be part of a SAN fabric. The system described herein may be implemented using software, hardware, and/or a combination of software and hardware where software may be stored in a computer readable medium and executed by one or more processors.

Each of the non-volatile storage devices 33a-33c may be coupled to a corresponding disk adapter unit (DA) 35a-35c that provides data to a corresponding one of the non-volatile storage devices 33a-33c and receives data from a corresponding one of the non-volatile storage devices 33a-33c. An internal data path exists between the DA's 35a-35c, the HA 28 and the RA's 30a-30c of the storage device 24. Note that, in other embodiments, it is possible for more than one non-volatile storage device to be serviced by a DA and that it is possible for more than one DA to service a non-volatile storage device. The storage device 24 may also include a global memory 37 that may be used to facilitate data transferred between the DA's 35a-35c, the HA 28 and the RA's 30a-30c as well as facilitate other operations. The memory 37 may contain task indicators that indicate tasks to be performed by one or more of the DA's 35a-35c, the HA 28 and/or the RA's 30a-30c, and may contain a cache for data fetched from one or more of the non-volatile storage devices 33a-33c.

The storage space in the storage device 24 that corresponds to the non-volatile storage devices 33a-33c may be subdivided into a plurality of volumes or logical devices. The logical devices may or may not correspond to the physical storage space of the non-volatile storage devices 33a-33c. Thus, for example, the non-volatile storage device 33a may contain a plurality of logical devices or, alternatively, a single logical device could span both of the non-volatile storage devices 33a, 33b. Similarly, the storage space for the remote storage device 26 may be subdivided into a plurality of volumes or logical devices, where each of the logical devices may or may not correspond to one or more non-volatile storage devices of the remote storage device 26.

In some embodiments, an other host 22' may be provided. The other host 22' is coupled to the remote storage device 26 and may be used for disaster recovery so that, upon failure at a site containing the host 22 and the storage device 24, operation may resume at a remote site containing the remote storage device 26 and the other host 22'. In some cases, the host 22 may be directly coupled to the remote storage device 26, thus protecting from failure of the storage device 24 without necessarily protecting from failure of the host 22.

Figure 2:
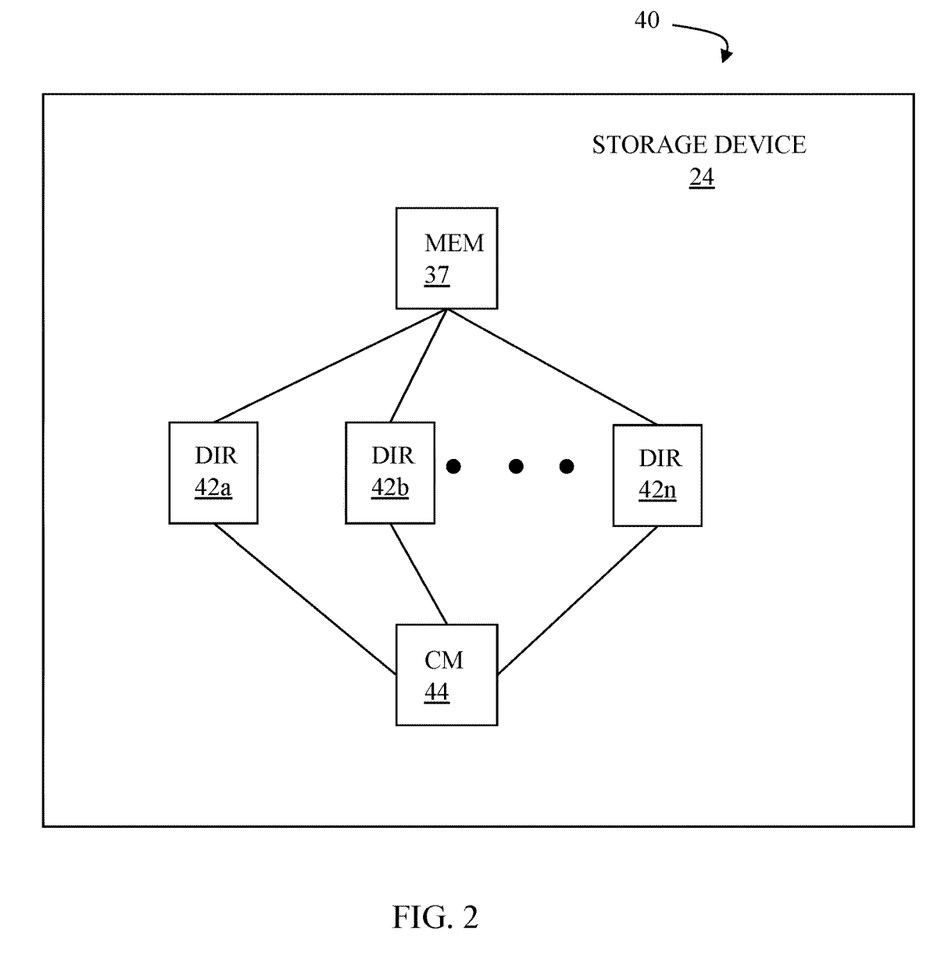
FIG. 2 is a schematic diagram illustrating an embodiment of the storage device where each of a plurality of directors are coupled to the memory according to an embodiment of the system described herein.

FIG. 2 is a schematic diagram 40 illustrating an embodiment of the storage device 24 where each of a plurality of directors 42a-42n are coupled to the memory 37. Each of the directors 42a-42n represents at least one of the HA 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 37. The CM 44 may be implemented using conventional MUX/router technology where one of the directors 42a-42n that is sending data provides an appropriate address to cause a message and/or data to be received by an intended one of the directors 42a-42n that is receiving the data. Some or all of the functionality of the CM 44 may be implemented using one or more of the directors 42a-42n so that, for example, the directors 42a-42n may be interconnected directly with the interconnection functionality being provided on each of the directors 42a-42n. In addition, one of the directors 42a-42n may be able to broadcast a message to all of the other directors 42a-42n at the same time.

In some embodiments, one or more of the directors 42a-42n may have multiple processor systems thereon and thus may be able to perform functions for multiple directors. In some embodiments, at least one of the directors 42a-42n having multiple processor systems thereon may simultaneously perform the functions of at least two different types of directors (e.g., an HA and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the storage device 24 may be provided as one or more director boards having CPUs, memory (e.g., DRAM, etc.) and interfaces with Input/Output (I/O) modules.

Note that, although specific storage device configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host devices with one or more storage devices in a manner that allows reconfiguring connections without having to physically disconnect and reconnect cables from and to ports of the devices. A storage area network may be implemented using one or more switches to which the storage devices and the host devices are coupled. The switches may be programmed to allow connections between specific ports of devices coupled to the switches. A port that can initiate a data-path connection may be called an "initiator" port while the other port may be deemed a "target" port.

Figure 3:
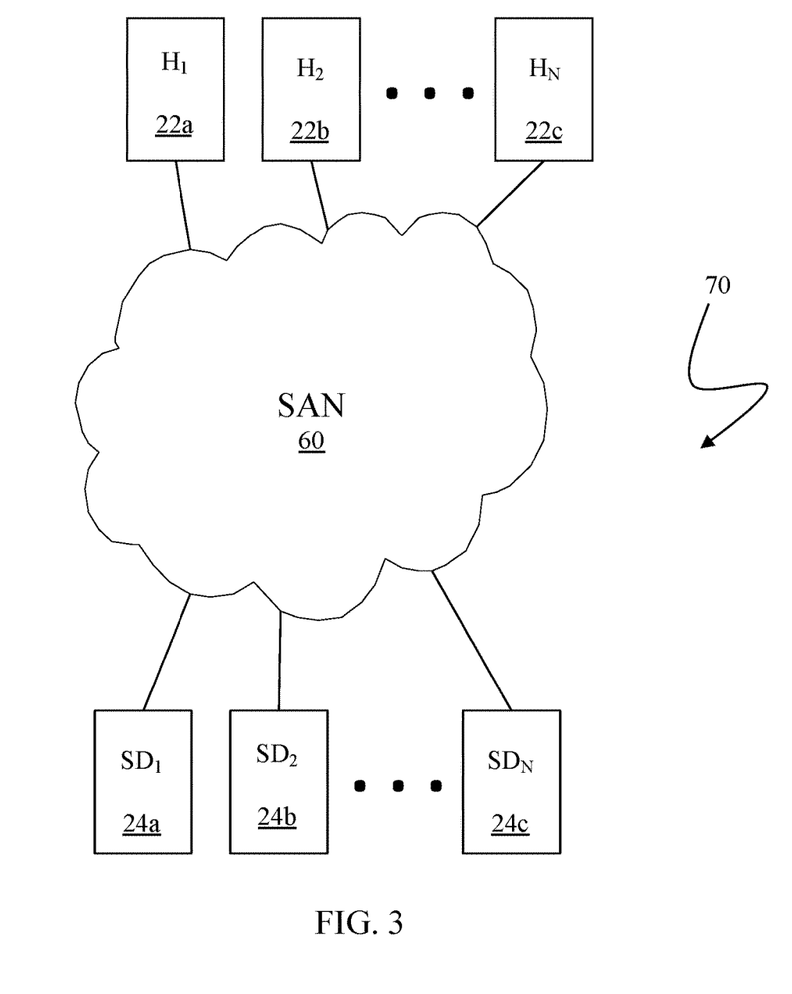
FIG. 3 is a schematic illustration showing a storage area network (SAN) providing a SAN fabric coupling a plurality of host devices to a plurality of storage devices that may be used in connection with an embodiment of the system described herein.

FIG. 3 is a schematic illustration 70 showing a storage area network (SAN) 60 providing a SAN fabric coupling a plurality of host devices ($H_1$-$H_N$) 22a-c to a plurality of storage devices ($SD_1$-$SD_N$) 24a-c that may be used in connection with an embodiment of the system described herein. Each of the devices 22a-c, 24a-c may have a corresponding port that is physically coupled to switches of the SAN fabric used to implement the storage area network 60. The switches may be separately programmed by one of the devices 22a-c, 24a-c or by a different device (not shown). Programming the switches may include setting up specific zones that describe allowable data-path connections (which ports may form a data-path connection) and possible allowable initiator ports of those configurations. For example, there may be a zone for connecting the port of the host 22a with the port of the storage device 24a. Upon becoming activated (e.g., powering up), the host 22a and the storage device 24a may send appropriate signals to the switch(es) of the storage area network 60, and each other, which then allows the host 22a to initiate a data-path connection between the port of the host 22a and the port of the storage device 24a. Zones may be defined in terms of a unique identifier associated with each of the ports, such as such as a world-wide port name (WWPN).

Figure 4:
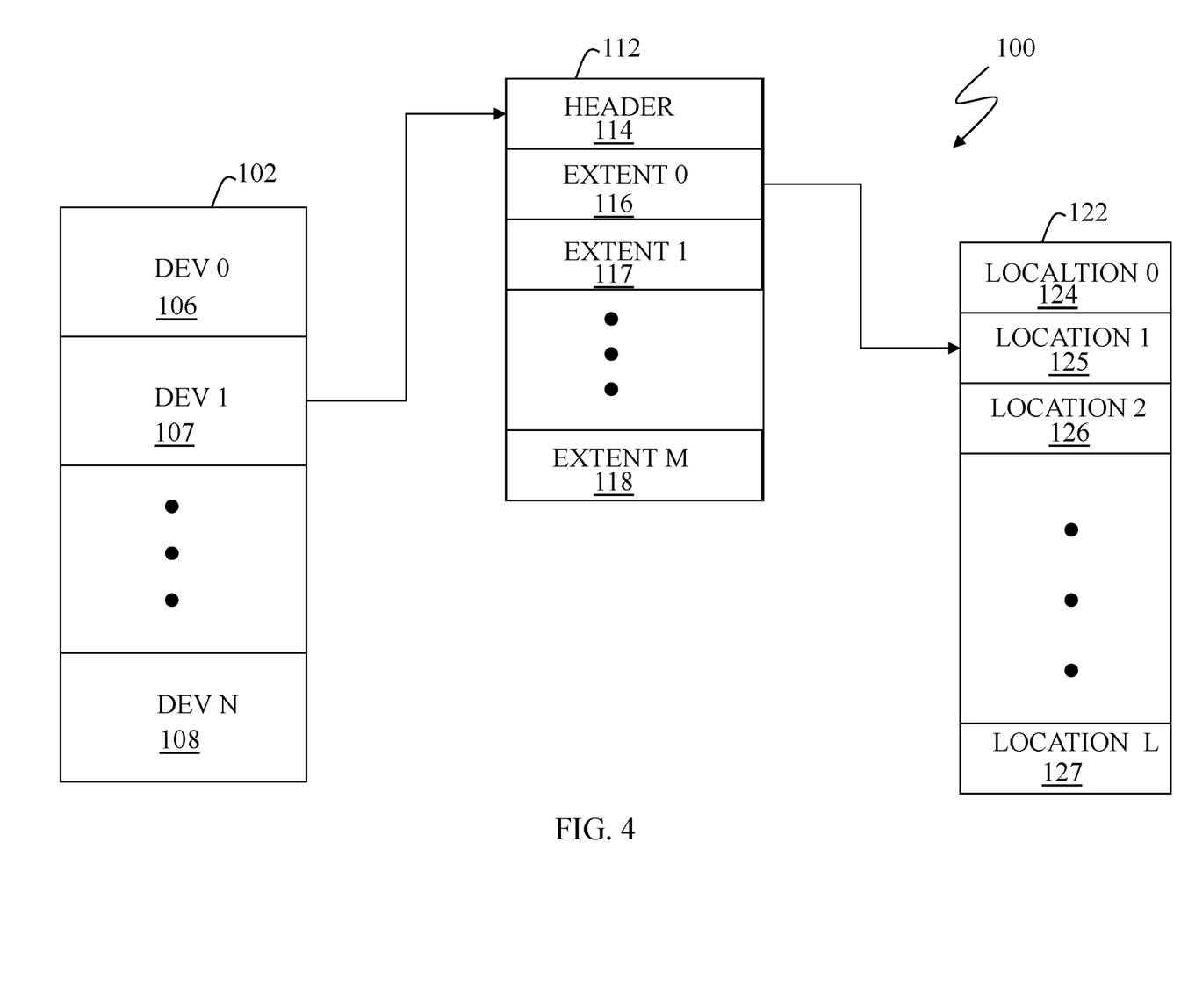
FIG. 4 is a schematic diagram illustrating tables that are used to keep track of device information in connection with an embodiment of the system described herein.

FIG. 4 is a schematic diagram 100 illustrating mapping storage for logical storage devices (logical devices, logical volumes) to physical storage space. Logical storage devices are addressed and accessed by the host 22 (and possibly other hosts and possibly other similar devices) while physical storage space includes physical devices on which the data is actually stored, such as the non-volatile storage devices 33a-33c, discussed above. A first table 102 corresponds to the logical devices that are accessed by the host 22. The table 102 includes a plurality of logical device entries 106-108 that correspond to each of the logical devices that may be accessed.

Each of the entries 106-108 of the table 102 correspond to a mapping table 112 that contains a mapping of extents of the corresponding entry to specific physical storage devices/locations. The mapping table 112 may include a header 114 having overhead information, such as information identifying corresponding physical device(s), information indicating the last time the logical device was accessed, information indicating when the logical device was created, access permissions, etc. The overhead information, or portions thereof, may be globally available to the storage device 24.

The mapping device table 112 may include one or more extent entries 116-118 that point to a physical storage table 122. The physical storage table 122 includes a plurality of physical storage entries 124-127 that indicate a particular physical storage location, such as portion(s) of the non-volatile storage devices 33a-33c, discussed above, for storing data for the corresponding extent. The information in each of the entries 126-128 may include a pointer (either direct or indirect) to a physical address of the non-volatile storage devices 33a-33c. For example, the extent entry 116 of the mapping device table 112 may indicate the physical storage entry 125, which points to a specific physical location of the non-volatile storage devices 33a-33c. Thus, the physical storage table 122 may be used in connection with mapping logical addresses of the logical devices corresponding to the tables 102, 112, 122 to physical addresses of the non-volatile storage devices 33a-33c of the storage device 24.

The tables 102, 112, 122 may be stored in (or copied to) the global memory 37 of the storage device 24. In addition, the tables corresponding to particular logical devices accessed by a particular host may be stored (cached) in local memory of the HA 28. In addition, the RA's 30a-30c and/or the DA's 35a-35c may also use and locally store (cache) portions of the tables 102, 112, 122. Modifying entries in the tables 102, 112, 122 allows movement of data from one physical location to another without changing how a logical device appears to a host or other entity that accesses the logical device.

In an embodiment herein, some or all of the non-volatile storage devices 33a-33c are implemented using Solid-State Drives (SSDs). SSDs may be built using various non-volatile memory technologies such as NAND flash (with different bit densities, e.g. SLC, MLC, TLC, QLC), phase change memory (PCM), magnetoresistive RAM (MRAM) and similar. References to SSDs herein include any and all types of SSDs. As discussed elsewhere herein, SSDs are provided by manufacturers with a Drive Writes Per Day (DWPD) rating that indicates an average number of writes per day of the entire capacity of the SSD that the SSD is designed to endure. For example, if an SSD has a capacity of 10,000 MB, and the DWPD of the SSD is 2, then the SSD is rated for 20,000 MB (2×10,000) average writes per day. In some cases, manufacturers may not honor a warrantee if failed SSD had sustained more writes than the DPWD rating of the SSD prior to failure. On the other hand, SSDs with a higher DWPD rating tends to be more expensive, and so it is desirable to use the more expensive SSD to its capacity without exceeding the DPWD rating. The system described herein moves data between different ones of the SSDs and changes corresponding entries in the tables 102, 112, 122 in a way that optimizes use of the SSDs.

The system described herein groups individual SSDs of the non-volatile storage devices 33a-33c into media pools and endurance pools. Media pools include a plurality of SSDs with the same DPWD rating and capacity while endurance pools are made up of a plurality of media pools with the same DPWD rating. In certain circumstances (described in detail below), the system will swap data between extents in different media pools in order to prevent any media pool from being overused (being written to at a rate that exceeds the DPWD rating) or underused (being written to at a rate that is far below the DPWD rating). Overuse and underuse are determined based on credits applied to each media pool. This is explained in more detail elsewhere herein.

Figure 5:
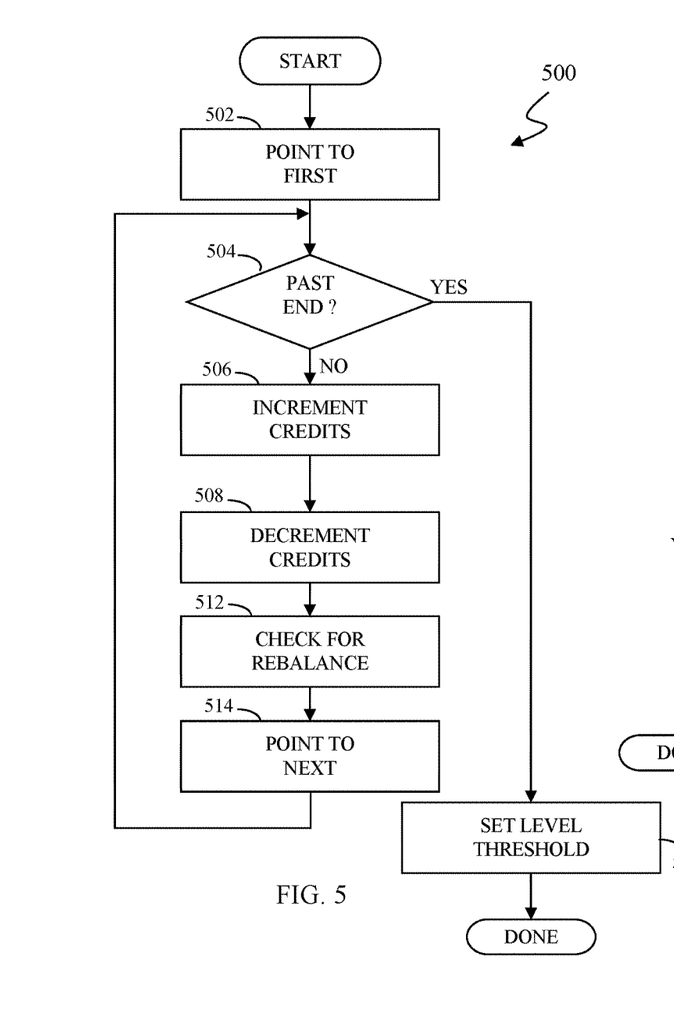
FIG. 5 is a flow diagram illustrating determining credits for media pools of a storage device according to the system described herein.

Referring to FIG. 5, a flow diagram 500 illustrates determining credits for each of the media pools used in a system. In an embodiment herein, credits for media pools are determined at pre-determined time intervals and the credit values are used to determine if data for extents of one media pool should be swapped with data for extents of another media pool. In an embodiment herein, the DPWD value is normalized to take into account the fact that the pre-determined interval for evaluating credits may not be a day. The normalized value (normalized wear rating), NWR, is given by:

$$NWR = DPWD \cdot \tau / 86,400$$

where $\tau$ is the amount of time of the pre-determined interval in seconds. Note that 84,600 is the number of seconds in a day.

Processing begins at a first step 502 where an iteration pointer, that iterates through all of the media pools, is set to point to the first media pool. Following the step 502 is a test step 504 where it is determined if the iteration pointer points past the end of the list of all of the media pools (i.e., the credits for all of the media pools have been determined). If not, control passes from the test step 504 to a step 506 where the credit for extents of a media pool, $C_m$, is incremented by a fixed amount as follows:

$$C_m = C_m + N \cdot NWR$$

where N is the number of extents in the media pool. Thus, for each iteration, the credit allocated to each extent of a pool is incremented by N·NWR. Note that the credit amount for each extent of each medial pool may be initialized to N·NWR.

In some cases, if a particular SSD has been previously used (is not new), then credit value for the media pool containing the particular device, and all additions to credit value for the media pool, should be adjusted to account for the prior use. An adjustment co-efficient, $\alpha$, may be used to adjust credit amounts to account for prior use of an SSD. In instances where all drives have the same lifespan, either because all drives were new when the system was initialized and/or because any drives that were added had the same lifespan, then $\alpha=1$. However, when added drives are older than drives in a media pool, then the amount of credit provided on each iteration must be reduced by an amount that accounts for the difference. Thus, $$\alpha = (1-PLU1) + PLU2$$

where PLU1 is the percentage of life used for the drive being added and PLU2 is the percentage of life used for the media pool.

As an example, if the percentage of life used (PLU) of a drive being added is 70% (0.7) and the PLU of storage devices in the media pool (not counting drive being added) is 90% (0.9), then $\alpha=(1-0.7)+0.9=0.8$. Thus, in such a case, credits added to extents corresponding to the added (older) SSD will be reduced by 20% (multiplied by 0.8).

For each extent in a media pool, the number of bytes written, $\Delta W$, in an interval is used to determine a value NWR_SCORE as follows:

$$NWR\_SCORE = \frac{\Delta W}{S}$$

where S is the size (capacity) of the extent. Thus, for example, if $\Delta W$ is 100 MB for a particular extent in a particular interval and S of the extent is 200 MB, then NWR_SCORE for the extent in the interval would be 0.5.

Following the step 506 is a step 508 where the credit amount for each extent is decremented by an amount. One possibility is to simply subtract the NWR_SCORE value for each extent from the credit accumulated for the extent to determine the amount of wear on the physical storage used for the extent. However, in some cases, the actual wear-out of an SSD drive may depend not only on the total amount of data written, but also the I/O size, alignment and access patterns. Accordingly, in an embodiment herein, the system may periodically adjust the NWR_SCORE values to account for I/O size, alignment and access patterns by determining a correction factor, $\lambda$, that represents a ratio of an average percent life used (PLU) of a particular SSD with an expected PLU of the particular SSD. That is:

$$\lambda = \frac{AVERAGE\_PLU}{EXPECTED\_PLU}$$

An average PLU, Average_PLU, of the particular SSD may be reported by the SSD. That is, it is possible to provide an inquiry to the SSD and receive a response therefrom indication average PLU. The expected PLU, Expected_PLU, may be determined by the following:

$$Expected\_PLU = \frac{(Capacity\ of\ SSD) \cdot \tau \cdot MP\_AVG\_NWR}{Amount\ of\ data\ written}$$

The capacity of the SSD is known. The value of $\tau$, the interval period, is discussed above. The amount of data written is known. The value of MP_AVG_NWR, the average normalized wear rating for a medial pool, may be determined as described below.

At each iteration, an average NWR score may be calculated for each extent as follows:

$$AVG\_NWR\_SCORE(1) = NWR\_SCORE(1)$$

$$AVG\_NWR\_SCORE(t) =$$
$$\frac{(t-1) \cdot AVG\_NWR\_SCORE(t-1) + NWR\_SCORE(t)}{t}, t > 1$$

For each media pool, the average NWR, MP_AVG_NWR, is provided by the sum of the AVG_NWR_SCORE values for all of the extents in the media pool, as follows:

$$\text{MP\_AVG\_NWR} = \frac{1}{N} \cdot \sum_{i=0}^{N-1} \text{AVG\_NWR\_SCORE}_i$$

where i represents the set of extents in the media pool.

Thus, λ is determined and, at the step 508, the credit amount for each extent is decremented by λ·NWR_SCORE.

Following the step 508 is a step 512 where a media pool is marked for rebalancing or not based on the credit determinations for the media pools. Marking a media pool for rebalancing causes subsequent processing to move data on the non-volatile storage devices 33a-33c (and adjust the tables 102, 112, 122) to prevent use of an SSD to exceed the rating thereof. Processing at the step 512 is discussed in more detail elsewhere herein.

Following the step 512 is a step 514 where the pointer that iterates through all of the media pools is incremented. Following the step 514, control passes back to the step 504, discussed above, for another iteration. If it is determined at the test step 504 that all of the media pools have been processed, then control passes from the step 504 to a step 516 where any media pools marked for rebalancing at the step 512 are processed to move data between extents, as described in more detail elsewhere herein. Following the step 516, processing is complete.

The processing at the step 512 determines whether a particular extent is accessed frequently enough so that the extent is expected to exceed the wear rating of the extent. The determination is based on past accesses and a current rate of accesses. The system also attempts to have the access frequency be high enough so that the system is not underutilized. In an embodiment herein, a value, β, is defined as the desired minimum percent utilization of the SSD. For example, β could be chosen to be 0.95, indicating that it is desirable to use at least 95% of the capacity of the SSDs.

Figure 6:
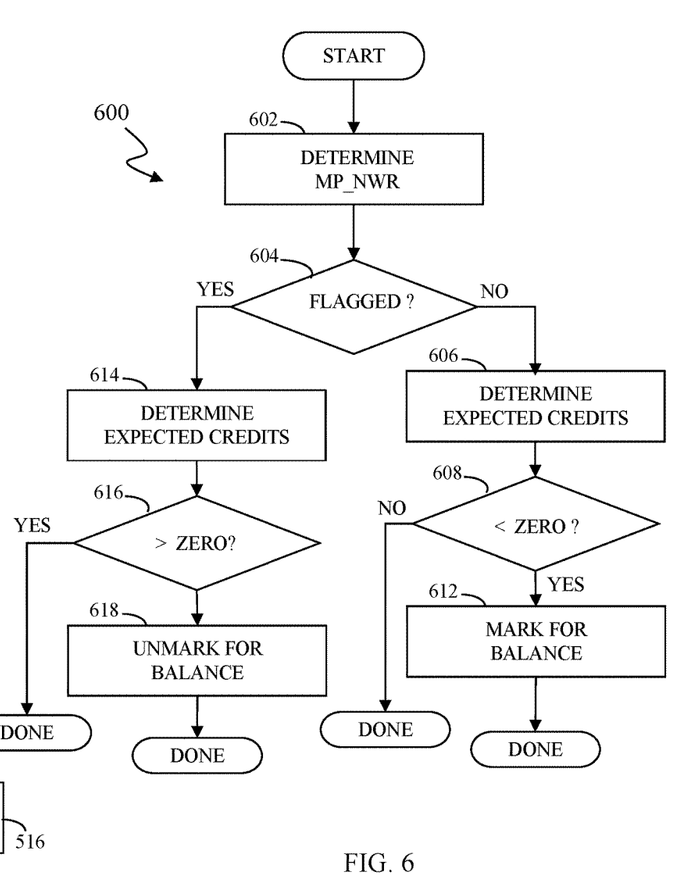
FIG. 6 is a flow diagram illustrating processing performed in connection with determining whether to mark a media pool for rebalancing or not according to an embodiment of the system described herein.

Referring to FIG. 6, a flow diagram 600 illustrates processing performed in connection with determining whether to mark a media pool for rebalancing or not. Processing begins at a first step 602 where a quantity, MP_NWR, representing the normalized media pool normalized wear rating, is determined, according to the following formula:

$$\text{MP\_NWR} = \sum_{i=0}^{N-1} \text{AVG\_NWR\_SCORE}_i$$

where i represents the set of extents in the media pool so that MP_NWR is the sum of the average NWR scores of each of the extents that make up the media pool.

Following the step 602 is a test step 604 where it is determined if the media pool being processed is already marked for rebalancing (from a previous iteration). If not, then control transfers from the step 604 to a step 606 where expected credits at end of life for the media pool are determined. The expected credits at end of life, CREDIT_EOL, are determined at the step 606 by the following formula:

$$\text{CREDIT\_EOL} = C_m + (T-\tau) \cdot (\beta \cdot \alpha \cdot N \cdot \text{NWR} - \lambda \cdot \text{MP\_NWR})$$

T is the total time of the warrantee period so that the amount of time left in the warrantee period (time to end of life) is (T−τ). The values for β, α, NWR, λ, and MP_NWR are discussed elsewhere herein. N is the number of extents in the media pool.

Following the step 606 is a test step 608 where it is determined if CREDIT_EOL is less than zero. If not, then processing is complete. Otherwise, control transfers from the test step 608 to a step 612 where the media pool is marked for rebalancing. Rebalancing media pools is discussed in more detail elsewhere herein. Following the step 612, processing is complete.

If it is determined at the test step 604 that the media pool being processed has already been marked for rebalancing (in a previous iteration), then control transfers from the test step 604 to a step 614 where the expected credits at end of life for the media pool are determined. The expected credits at end of life, CREDIT_EOL, are determined at the step 614 by the following formula:

$$\text{CREDIT\_EOL} = C_m + (T-\tau) \cdot (\alpha \cdot N \cdot \text{NWR} - \text{MP\_NWR})$$

The values for T, N, α, NWR, λ, and MP_NWR are discussed elsewhere herein. Note that the formula at the step 614 is slightly different than the formula at the step 606. The formula at the step 614 does not take into account β, the desired minimum percent usage of the SSD. Following the step 614 is a test step 616 where it is determined if CREDIT_EOL is greater than zero. If not, then processing is complete. Otherwise, control transfers from the test step 616 to a step 618 where the media pool is unmarked for rebalancing. Following the step 618, processing is complete.

Figure 7:
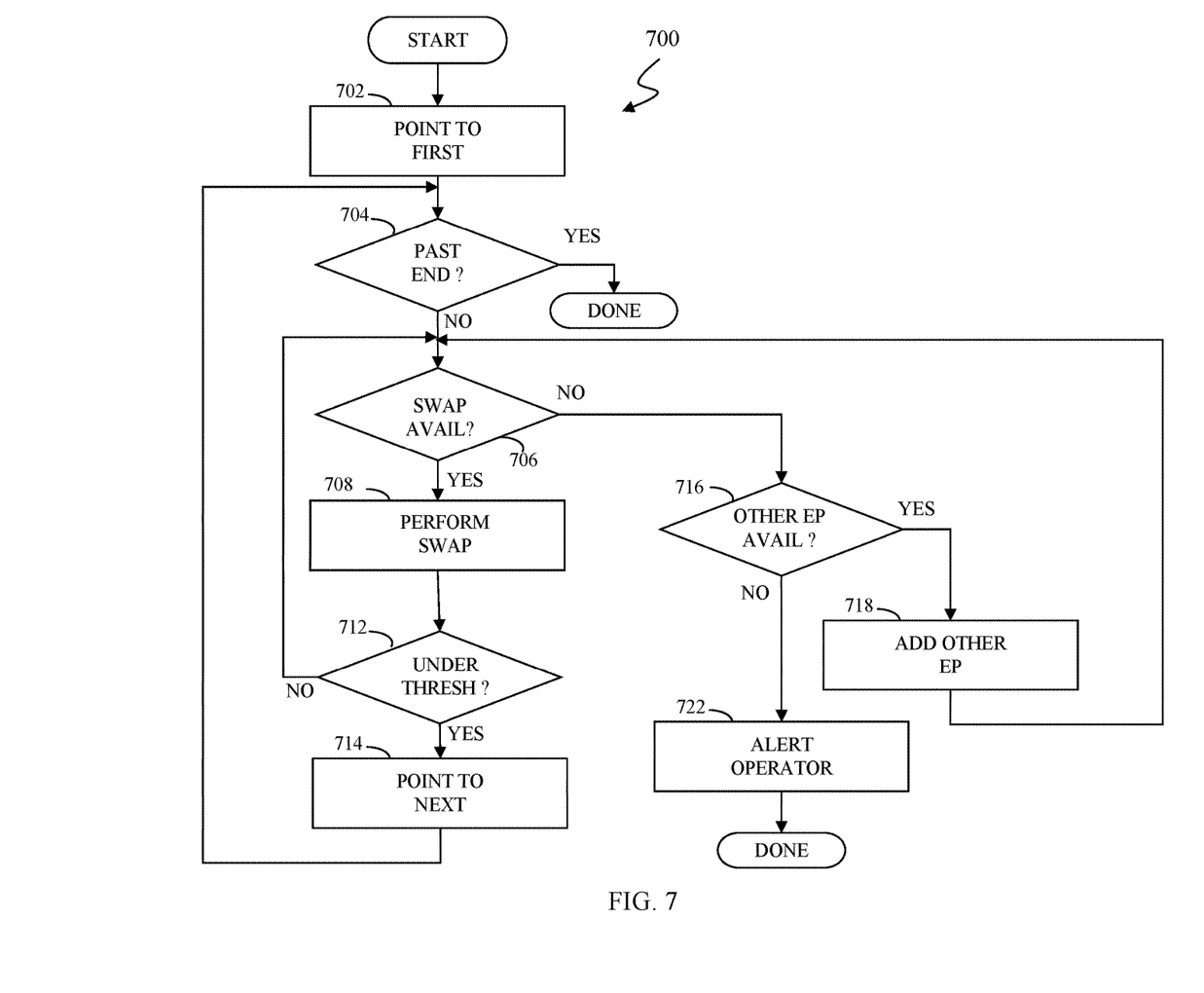
FIG. 7 is a flow diagram that illustrates rebalancing media pools that are marked for rebalancing according to an embodiment of the system described herein.

Referring to FIG. 7, a flow diagram 700 illustrates in more detail the step 516 of FIG. 5, described above, where a rebalancing operation performed for media pools that are marked for rebalancing. Processing begins at a first step 702 where an iteration pointer that iterates through all of the medial pools marked for rebalancing is initialized to point to the first media pool marked for rebalancing. Following the step 702 is a test step 704 where it is determined if the iteration pointer points past the end of the list of media pools marked for rebalancing (i.e., all media pools marked for rebalancing have been rebalanced). If so, then processing is complete. Otherwise, control transfers from the test step 704 to a test step 706 where it is determined if the most active extent in the media pool that has not yet been swapped can be swapped with a least active extent in another media pool that has not yet been swapped. On an initial pass, the least active extent is taken from media pools in the same endurance pool but, as described in more detail elsewhere herein, it is possible to look for a least active extent in all of the media pools in all of the endurance pools. The test at the step 706 determines if there is another eligible media pool with a positive credit value (see discussion above). If so, then the most active extent in the media pool that has not yet been swapped is swapped with a least active extent in another media pool that has not yet been swapped. In an embodiment herein, the data in the non-volatile storage devices 33a-33c is not actually swapped at the step 708. Instead, the data is marked to be swapped the next time a write is performed (re-allocate on write), but of course, any appropriate swapping mechanism may be used, including swapping the data instantly at the step 708.

Following the step 708 is a test step 712 where it is determined if the result of performing the swap at the step 708 resulted in sufficiently lowering the credit deficit of the media pool. In an embodiment herein, the determination at the step 712 is made by first determining a temporary threshold, as follows:

$$\text{Temp\_Thresh} = \alpha \cdot N \cdot NWR + \frac{c_m}{(T-\tau)}$$

The value for Temp_Thresh is compared to the sum of the average NWR scores for extents in the media pool after swapping the extents, which is given by:

$$\Sigma_0^{N-1} \text{AVG\_NWR\_SCORE}_i$$

where i represents the set of extents in the media pool, including the extents swapped in to the media pool at the step 708, discussed above.

If it is determined at the step 712 that the media pool has transitioned to be under the temporary threshold after the last swap, then the media pool is balanced and control transfers from the test step 712 to a step 714 where the iteration pointer that iterates through all of the medial pools marked for balancing is incremented to point to the next media pool that needs balancing. Following the step 714, control transfers back to the test step 704, discussed above, for another iteration. If it is determined at the step 712 that the media pool has not transitioned to be under the temporary threshold after the last swap (i.e., the sum of the average NWR scores for extents in the media pool are less than TEMP_THRESH), then the media pool is not balanced and control transfers from the test step 712 back to the step 706, discussed above, to swap another active extent (the next most active extent) of the media pool.

If it is determined at the test step 706 that there are no possible swaps available (discussed above), then control transfers from the test step 706 to a test step 716 where it is determined if the other endurance pools are available for swapping extents. In an embodiment herein, the system first swaps extents within a single endurance pool, but if there are no available extents for swapping with active extents in a media pool being rebalanced, then all of the media pools in all of the endurance pools are used. If it is determined at the test step 716 that the other endurance pools may still be used (because only a single endurance pool was being used prior to that), then control transfers from the test step 716 to a step 718 to expand to use all of the extents from all of the media pools from all of the endurance pools. Following the step 718, control transfers back to the step 706, discussed above, to continue to look for extents to swap to address the unbalanced media pool. Alternatively, if it is determined at the test step 716 that the other endurance pools may not still be used (because the other endurance pools are already being used), then control transfers from the test step 716 to a step 722 to alert a user/operator that the capacity of the system has been exceeded. That is, if it is not possible to balance all of media pools, then the user/operator needs to be altered to take remedial action, such as purchasing more SSDs for the system. Following the step 722, processing is complete.

In various embodiments, the system described herein may be used in connection with performance data collection for data migration and/or data mirroring techniques using a SAN. Data transfer among storage devices, including transfers for data migration and/or mirroring functions, may involve various data synchronization processing and techniques to provide reliable protection copies of data among a source site and a destination site. In synchronous transfers, data may be transmitted to a remote site and an acknowledgement of a successful write is transmitted synchronously with the completion thereof. In asynchronous transfers, a data transfer process may be initiated and a data write may be acknowledged before the data is actually transferred to directors at the remote site. Asynchronous transfers may occur in connection with sites located geographically distant from each other. Asynchronous distances may be distances in which asynchronous transfers are used because synchronous transfers would take more time than is preferable or desired. Examples of data migration and mirroring products includes Symmetrix Remote Data Facility (SRDF) products from DELL EMC.

Although the system described herein has been discussed in connection with the use of tracks as a unit of data for certain purposes, it should be understood that the system described herein may be used with any appropriate units or structures of data, such as tracks, and further including, possibly, variable length units of data. It is also noted that one or more storage devices having components as described herein may, alone or in combination with other devices, provide an appropriate platform that executes any of the steps described herein. The system may operate with any snapshot mechanism not inconsistent therewith and further with any appropriate point-in-time image mechanism.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of moving data among a plurality of non-volatile storage devices of a storage device, comprising:

accumulating credits at each of a plurality of periodic intervals for separate portions of the devices, wherein the portions of devices correspond to media pools having a same wear rating and storage capacity, wherein the credits accumulate as a function of the wear rating for each of the devices and wherein the wear rating is based on an average number of writes per day of an entire capacity of the non-volatile storage device that the non-volatile storage device is designed to endure by the manufacturer of the non-volatile storage device;

reducing credits for each of the media pools at each of the periodic intervals as a function of: an amount of data written to each of the media pools during each of the intervals, the wear rating for each of the devices, a storage capacity of the devices, and a percent life used for the devices;

reducing credits for a particular one of the media pools for which at least one device has been added, wherein credits are reduced based on a difference between a percentage of life used of devices in the particular one of the media pools prior to adding the at least one device and a percentage of life used of the at least one device; and moving data from a first one of the media pools having a relatively low amount of credits to a second one of the media pools having a relatively high amount of credits.

2. A method, according to claim 1, wherein the devices are solid state drives.

3. A method, according to claim 2, wherein the wear rating is a drive writes per day rating provided by a manufacture of the solid state drive.

4. A method, according to claim 1, wherein the media pools are grouped into endurance pools having the same wear rating.

5. A method, according to claim 4, wherein the second media pool is chosen from a same endurance pool as the first media pool.

6. A method, according to claim 1, wherein moving data includes swapping data between the first one of the media pools and second one of the media pools.

7. A method, according to claim 6, wherein swapping data includes marking the data for reallocation on a next write.

8. A method, according to claim 1, wherein the non-volatile storage devices store data that is accessed on the storage device using a plurality of tables.

9. A method, according to claim 8, wherein the plurality of tables cause the storage device to present a logical device for access by a host.

10. A non-transitory computer-readable medium containing software that moves data among non-volatile storage devices of a storage device, the software comprising:

executable code that accumulates credits at each of a plurality of periodic intervals for separate portions of the devices, wherein the portions of devices correspond to media pools having a same wear rating and storage capacity, wherein the credits accumulate as a function of the wear rating for each of the devices and wherein the wear rating is based on an average number of writes per day of an entire capacity of the non-volatile storage device that the non-volatile storage device is designed to endure by the manufacturer of the non-volatile storage device;

executable code that reduces credits for each of the media pools at each of the periodic intervals as a function of: an amount of data written to each of the media pools during each of the intervals, the wear rating for each of the devices, a storage capacity of the devices, and a percent life used for the devices;

executable code that reduces credits for a particular one of the media pools for which at least one device has been added, wherein credits are reduced based on a difference between a percentage of life used of devices in the particular one of the media pools prior to adding the at least one device and a percentage of life used of the at least one device; and executable code that moves data from a first one of the media pools having a relatively low amount of credits to a second one of the media pools having a relatively high amount of credits.

11. A non-transitory computer-readable medium, according to claim 10, wherein the devices are solid state drives.

12. A non-transitory computer-readable medium, according to claim 11, wherein the wear rating is a drive writes per day rating provided by a manufacture of the solid state drive.

13. A non-transitory computer-readable medium, according to claim 10, wherein the media pools are grouped into endurance pools having the same wear rating.

14. A non-transitory computer-readable medium, according to claim 13, wherein the second media pool is chosen from a same endurance pool as the first media pool.

15. A non-transitory computer-readable medium, according to claim 10, wherein moving data includes swapping data between the first one of the media pools and second one of the media pools.

16. A non-transitory computer-readable medium, according to claim 15, wherein swapping data includes marking the data for reallocation on a next write.

17. A non-transitory computer-readable medium, according to claim 10, wherein the non-volatile storage devices store data that is accessed on the storage device using a plurality of tables.

18. A non-transitory computer-readable medium, according to claim 17, wherein the plurality of tables cause the storage device to present a logical device for access by a host.

* * * * *